3,182,051
POLYMERIZATION OF 1,3-BUTADIENE TO CRYS-
TALLINE POLYBUTADIENES HAVING A SYN-
DIOTACTIC 1,2-STRUCTURE
Gerlando Marullo, Umberto Maffezzoni, and Ermanno
Susa, Milan, Italy, assignors to Montecatini Società
Generale per l'Industria Mineraria e Chimica, Milan,
Italy
Filed Nov. 15, 1960, Ser. No. 69,346
Claims priority, application Italy, Nov. 18, 1959,
19,154/59; Apr. 5, 1960, 5,953/60
8 Claims. (Cl. 260—94.3)

This invention relates to a process for polymerizing 1,3-butadiene to high polymers having a regular structure.

More particularly it relates to a process which makes possible the production of crystalline 1,3-butadiene polymers which have almost exclusively a syndiotactic structure and 1,2-linkages.

The production of these polymers possessing this high degree of steric purity i.e., practically free from other polymer molecules possessing different linkages, is achieved by using as polymerization catalysts a freshly prepared catalyst comprising either a halide of a group 8 metal of the Mendeleeff Periodic Table and an aluminum trialkyl or a halide of a group 8 metal of the Mendeleeff Periodic Table and a mixture containing an aluminum trialkyl and a dialkyl aluminum monohalide, said aluminum trialkyl and dialkyl aluminum monohalide being present in certain molar ratios.

Figure 1:
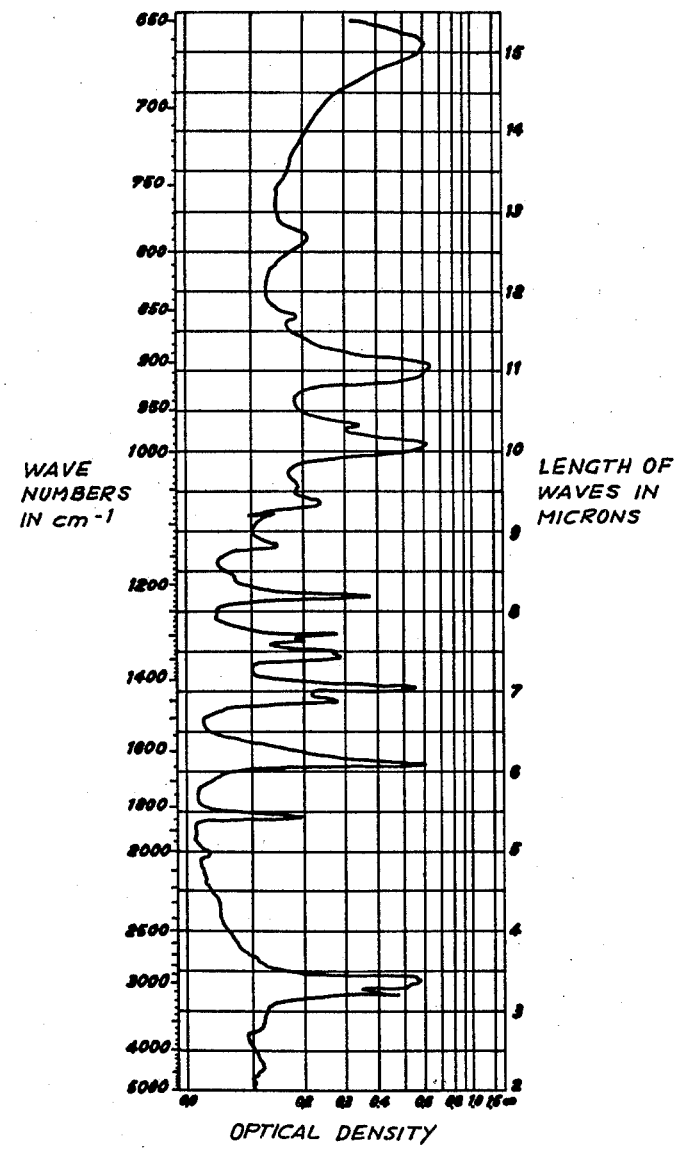
FIGURE 1 is a graphic representation of the spectral lines shown by samples of the polymers produced according to the process of the present invention upon infrared spectrographic examination.

It is accordingly an object of this invention to provide an improved process for the polymerization of 1,3-butadiene to obtain crystalline polymers having substantially only a syndiotactic 1,2-structure.

In a planar representation this structure is pictured as a succession of the following groups:

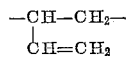

in which the vinyl groups are alternatively below and above the plane upon which the principal polymer chain is supposedly stretched.

It is well known that the course of the polymerization process as well as the characteristics of the polymer produced depend upon the nature of the metal compound and organometallic compound used as the catalyst.

Thus by polymerizing butadiene in the presence of a catalyst containing a group 8 metal compound, such as a cobalt compound, and an alkyl aluminum halide, in any ratio of aluminum to group 8 metal, polymers having a substantially cis-1,4-structure are obtained.

It is also known that a polymer of the same cis-1,4-structure can be obtained using a catalyst containing a group 8 metal compound, such as cobalt chlorides or bromides and an aluminum trialkyl, provided that aluminum to cobalt molar ratios lower than 1 are used and this catalytic mixture, prior to its use, is aged for several hours until its color changes from blue to black.

It has been found according to one aspect of the present invention that by operating with a freshly prepared catalyst containing a group 8 metal halide and a trialkyl aluminum compound, that is, a catalyst which is employed after its preparation without being subjected to prolonged aging, it is possible to obtain yields of a crystalline butadiene polymer having a very high content of polymer molecules with a syndiotactic 1,2-structure. Halides of group 8 metals which are suitable for use in this catalyst are chlorides, bromides, iodides, particularly but not exclusively those halides in which the group 8 metal possesses a valence less than its highest valence. Other suitable compound of group 8 metals also include soluble complexes of cobalt, nickel, platinum, or palladium halides, which halides are complexed with organic nitrogen bases such as pyridine or some other complex forming substance, such as pyrrole, morpholine, aliphatic primary, secondary and tertiary amines, nitriles, amides, alcohols, ketones or phosphorus containing compounds such as phosphines and alkyl phosphates or phosphites. These complexes are prepared in general by suspending the metal salt in benzene and adding the complexing agent to the suspension. After stirring the suspension is filtered, and the clear solution containing the complex is used.

As the other catalytic component, any aluminum trialkyl may be used, preferably those containing alkyl groups with 1 to 5 carbon atoms, such as trimethyl, triethyl, tripropyl, triisobutyl, etc.

Any molar ratio of aluminum group 8 metal can be employed. When using ratios varying from 0.3 to 500, there is obtained substantially pure syndiotactic-1,2-polybutadiene, however, with ratios above 4 the catalyst becomes rapidly inactive. Thus in such cases the butadiene monomer, or at least a portion thereof, must be introduced either before, together with or immediately after the addition of the trialkyl aluminum to the group 8 metal compound.

When high aluminum group 8 metal ratios are employed it is particularly necessary to avoid aging the catalyst before its contact with the diolefin, since this aging causes the production of higher and higher amounts of polymer containing the cis-1,4-structure. To avoid this undesired production of the cis-1,4-polymer, it is advisable to mix the two catalytic ingredients in the presence of a certain amount of diolefin.

The use of freshly prepared catalytic mixtures is therefore always advantageous in order to assure the high activity of the catalyst and a good yield of polymer product.

By a "freshly prepared" catalyst, it is intended to mean a catalytic mixture prepared at room temperature and matured or aged at this temperature for a period not longer than one hour before its use. The high activity of the catalytic mixture may be maintained for a much longer period of time, however, if the mixture is stored at temperature lower than 0° C. after its preparation.

When a catalyst such as cobaltous chloride and triethyl aluminum, prepared at room temperature with an Al/Co molar ratio of 0.65, is used after allowing the catalytic mixture to stand at room temperature for one hour, a product consisting substantially of a polymer having a syndiotactic-1,2-structure is obtained. If, however, the same catalyst is used after standing at room temperature for several hours, the polymer contains considerable amounts of the cis-1,4-structure. This amount of cis-1,4-polymer increases with the aging time of the catalyst, since for example after allowing the catalyst to age for six hours at a temperature of 15° C., 80% of the polymer has this cis 1,4-structure.

It has also been found, according to another aspect of the present invention, that crystalline polybutadiene possessing a syndiotactic 1,2-structure can be obtained by employing a freshly prepared polymerization catalyst containing a halide of a group 8 metal of the Mendeleeff Periodic Table and a mixture of a trialkyl aluminum and a dialkyl aluminum monohalide, where the molar ratio of trialkyl aluminum/dialkyl aluminum monohalide ($AlR_3/AlR'_2X$, R and R' each represents an alkyl group either the same or different from each other, X represents a halogen) is of at least 0.8:1.

These particular catalysts possess a high catalytic activity so that not only are syndiotactic-1,2-polybutadienes produced in a high degree of steric purity but the use of these catalysts makes possible a high polymerization rate.

The highest catalytic activity is obtained when the molar percentage of $AlR'_2X$ in the $AlR_3+AlR'_2X$ mixture is maintained between a minimum of about 10% and a maximum of about 53 percent. Above this maximum value, the activity of the catalyst decreases rapidly and becomes almost nil with a further increase of the $AlR'_2X$. By operating in the above range of compositions with catalysts containing a mixture of a trialkyl aluminum and a dialkyl aluminum monohalide there is obtained polymers having a higher crystallinity than polymers obtained using only trialkyl aluminum as the organometallic component under the same conditions.

The $AlR_3/AlR'_2X$ molar ratio is preferably kept around 1:1. When using percentages of $AlR'_2X$ higher than 55% ($AlR_3$ to $AlR'_2X$ ratios below 0.8:1) there is a progressive variation in the stereospecificity of the catalysts so that the polymers produced contain increasing proportions of chains having cis-1,4-structures in proportion to the increase in the amount of $AlR'_2X$ added.

The dialkyl aluminum monohalide ($AlR'_2X$) may be introduced into the reaction system in any suitable manner, either before, simultaneously with or after the introduction of the trialkyl aluminum compound. In all cases an increase in activity of the catalysts so obtained is noted, however, the best results are attained by adding previously prepared mixtures of the two organo-metallic components to the reaction system.

The preferred dialkyl aluminum monohalides used in the catalysts are diethyl aluminum monochloride and diisobutyl aluminum monochloride: dialkyl halides containing alkyls with 1 to 5 carbon atoms may be used.

Any aluminum trialkyl may be used as the trialkyl aluminum compound; especially those containing alkyl groups with 1 to 5 carbon atoms and preferably triethyl and triisobutyl groups.

Any group 8 metal halide previously disclosed as suitable for use with the freshly prepared catalyst having trialkyl aluminum as the organometallic component, such as complexes of group 8 metal halides with organic nitrogen bases i.e., pyridine may also be used with this $AlR_3+AlR'_2X$ containing catalyst.

The polymerization process of the present invention using the group 8 metal halides with either $AlR_3$ or the $AlR_3+AlR_2X$ mixtures, may be carried out in a batch or continuous manner at a temperature range of $-25°$ C. to $+30°$ C., preferably at room temperature.

The polymerization is preferably carried out in the presence of conventional inert solvents such as an aromatic hydrocarbon e.g., benzene, toluene, xylene etc., or a mixture of aromatic and aliphatic hydrocarbons. A solvent is considered inert when it will not destroy the polymerization catalyst.

Butadiene itself may also be used as the solvent.

The polymers produced by the process of the present invention have a wide variety of uses such as in the production of manufactured articles, films and fibers all, possessing interesting mechanical and chemical properties due in part to their content of reactive vinyl groups.

The following examples are given to illustrate the present invention without limiting its scope.

*Example 1*

800 cc. of benzene and 60 cc. of a benzene solution of cobalt chlorine pyridine ($CoCl_2-2(C_5H_5N)$) complex having a concentration of 0.134 g. $CoCl_2$ per liter are introduced into a previously cleaned, dried and evacuated 2000 cc. Autoclave provided with an agitator and a cooling jacket. 200 g. of 1,3-butadiene (98.5% pure) are then successively added while agitating.

Immediately thereafter 3.8 g. of $Al(C_2H_5)_3$ diluted with 140 cc. of benzene are added thus giving an Al/Co molar ratio of 550.

Agitation is continued for 15 hours while maintaining the inside temperature at 16° C. Polymerization is stopped by adding 200 cc. of methanol containing a conventional antioxidant (e.g., phenyl-$\beta$-naphthylamine) and the polymer formed is dried at 50° C. under vacuum.

71 g. of a product polymer in powder form are obtained.

Samples of the polymer product in the form of a lamina obtained by cold pressing, are subject to infrared spectrographic examination, using a Perkin-Elmer I.R. Spectrophotometer Model 21. This examination, the results of which are graphically represented in FIGURE 1, shows that the polymer is syndiotactic-1,2-polybutadiene.

The spectra obtained show all the bands characteristic of the vinyl bond ($R-CH=CH_2$) and shows specifically those at 908 and 990 cm.$^{-1}$ (CH bending outside the plane), 1640 cm.$^{-1}$ (stretching C=C), 1830 cm.$^{-1}$ (harmonic of the bending vibrations outside the plane) and at 3075–3090 cm.$^{-1}$ (stretching C—H). Moreover, the presence of the absorption band at about 660 cm.$^{-1}$ clearly shows the syndiotactic character of the polymer.

The absence of bands characteristic of the cis-1,4 and trans-1,4-structures shows that the unsaturation is of the vinyl type.

The polymer product was subjected to X-ray examination employing a diffractometer with a Geiger counter (CuK$\alpha$).

Figure 2:
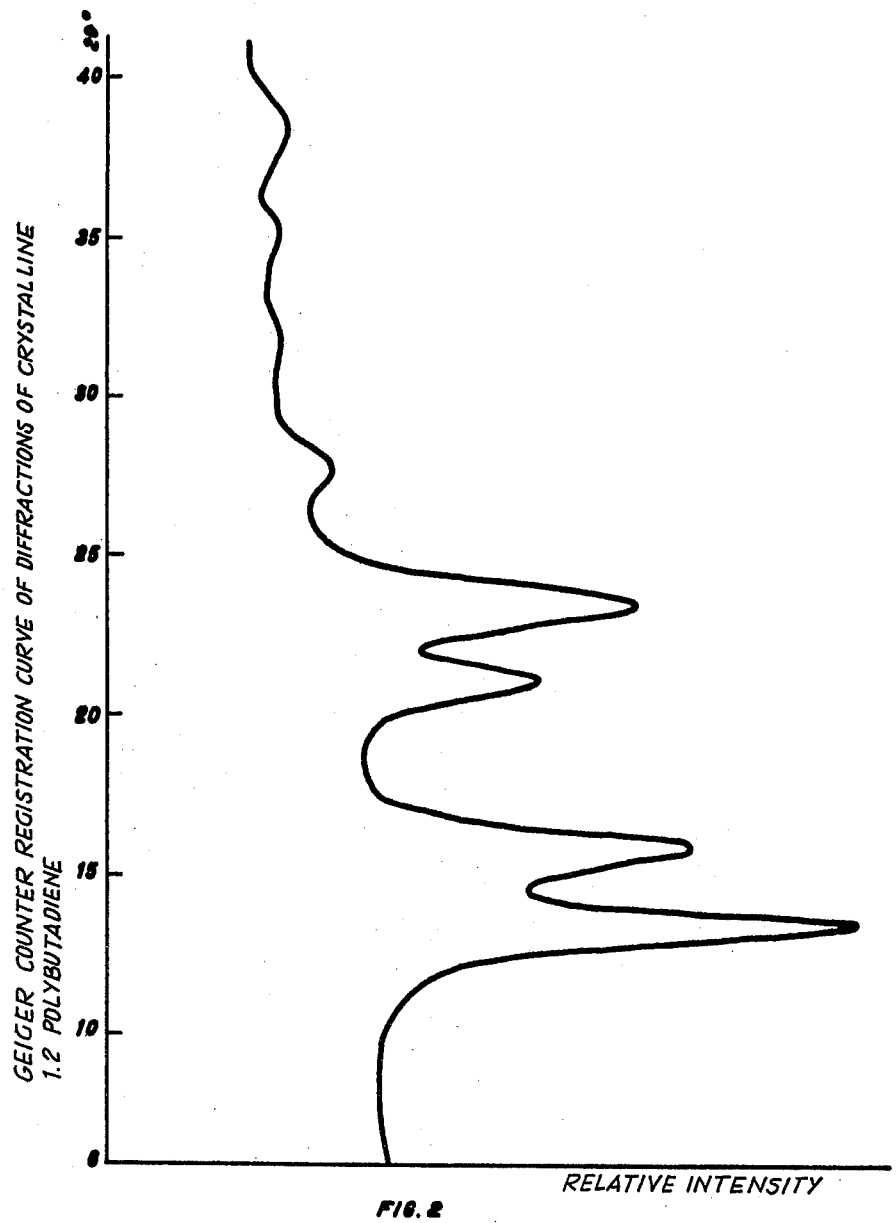
FIGURE 2 is a registration curve of the diffractions given upon X-ray examination of samples of the polymers produced according to the present invention.

The spectrum obtained presents all and only the crystalline reflections of syndiotactic 1,2-polybutadiene, as shown by FIGURE 2.

The crystallinity of the product is high (78.8%) which demonstrates that the product sample is pure and has highly regular structure.

The polymer is subjected to selective solvent extraction with various solvents and thus a 1.2% acetone extract, a 0.84% ethyl ether extract and a 0.4% benzene extract was obtained. The residue was determined by X-ray examination to have a crystallinity of 81%.

*Example 2*

800 cc. of benzene and 75 cc. of a benzene solution of cobalt chloride pyridine complex having a concentration of 0.134 g. of $CoCl_2$ per liter are introduced into a carefully cleaned, dried and evacuated 2000 cc. autoclave provided with an agitator and cooling jacket. 100 g. of 1,3-butadiene (98.5% pure) are then successively added while agitating the mixture.

A mixture containing 1.9 g. of $Al(C_2H_5)_3$ and 2 g. of $Al(C_2H_5)_2Cl$ (Al/Cl ratio=2) diluted with 140 cc. of benzene are then immediately added thus giving a Al/Co molar ratio of 430.

The whole reaction mixture is agitated for 1 hour while the inner temperature is maintained at 16° C. The polymerization is then stopped by the addition of 200 cc. of methanol containing a conventional antioxidant and the polymer product is dried at 50° C. under vacuum.

36.5 g. of a powdery product are obtained.

Samples of this product in the form of lamina obtained by cold pressing are subjected to infrared spectrographic analysis in the manner of Example 1.

Their spectra, which are also graphically represented by FIGURE 1, present all the bands characteristic of the vinyl bond ($RCH=CH_2$) and show specifically bands at 908 and 990 cm.$^{-1}$ (CH bending outside the plane, 1640 cm.$^{-1}$ (stretching $C=C$), 1830 cm.$^{-1}$ (harmonic of the bending vibrations outside the plane) and at 3075–3090 cm.$^{-1}$ (stretching C—H).

The syndiotactic nature of the polymers clearly shown by the presence of a band at 660 cm.$^{-1}$.

The absence of bands characteristic of the cis-1,4 and trans-1,4-structure indicates that 100% of the unsaturation is of the vinyl type.

The polymer is also subjected to X-ray examination employing a diffractometer and a Geiger counter.

The spectrum obtained presents all and only the crystalline reflections of syndiotactic-1,2-polybutadiene, as shown by FIGURE 2.

The high crystallinity (91%) demonstrates that the sample is very pure and has a regular structure.

A polymer sample is subjected to successive solvent extraction with acetone, ether and benzene; the amounts extracted correspond to 0.70, 0.68, respectively 0.59% of the crude.

When a polymerization is carried out under the same conditions used in this example, but using 3.8 g. of $Al(C_2H_2)_3$ as the organometallic component in place of the $Al(C_2H_5)_3+Al(C_2H_5)Cl$ mixture, a polymer having a crystallinity of about 77%, measured by X-ray examination, is obtained.

This polymer upon solvent extraction in the absence of air give 1.8% acetone extract, a 7.4% ether extract and a 0.5% benzene extract. The residue upon X-ray examination shows a crystallinity of 80%.

*Example 3*

The polymerization is carried out as in Example 1, but the 1,3-butadiene and the benzene solution of $Al(C_2H_5)_3$ are introduced at the same time.

The polymerization is stopped after 15 hours as described in Example 1. 9 g. of dry polymer having syndiotactic-1,2-structure and a crystallinity of 76.5%, as determined by the X-ray examination procedure shown in Example 1, are obtained.

*Example 4*

The polymerization is carried out as in Example 2, except that a mixture containing 4.1 g. of $Al(i-C_4H_9)_3$ and 1.5 g. of $Al(C_2H_2)_2Cl$, corresponding to 33.3 millimols of organic aluminum compounds, is used as the organometallic component of the catalyst (Al/Cl molar ratio=1.6; Al/Co molar ratio=430).

The polymerization reaction is stopped after 1 hour and the polymer is dried as described in Example 2 thus obtaining 47.8 g. of polybutadiene having syndiotactic-1,2-structure and a crystallinity of 84% as determined by X-ray examination.

When the polymerization is carried out in the presence of 33.3 millimols of $Al(i-C_4H_9)_3$ as the sole organometallic component of the catalyst, all the other conditions being the same, 7 g. of a polymer having syndiotactic-1,2-structure and having a cystallinity of 75% as determined by X-ray examination, are obtained.

*Example 5*

The polymerization is carried out as in Example 1, but the 1,3-butadiene is added immediately after the benzene solution of $Al(C_2H_5)_3$.

The polymerization is stopped after 15 hours by adding methanol containing an antioxidant and the polymer obtained is dried at 50° C. under vacuum.

16 g. of dry polymer having a syndiotactic-1,2-structure and a crystallinity of 76.7%, as measured by X-ray examination, are obtained.

*Example 6*

The polymerization is carried out as in Example 4, except that the $Al(C_2H_5)_2Cl$ is replaced by $Al(i-C_4H_9)_2Cl$. 3.3 g. of $Al(i-C_4H_9)_3$ and 2.9 g. of $Al(i-C_4H_9)_2Cl$ are used as the organometallic component of the catalyst (Al/Cl molar ratio=2, Al/Co molar ratio=430).

The reaction is stopped after 1 hour and the polymer is dried at 50° C., under vacuum. 39.5 g. of polybutadiene with syndiotactic-1,2-structure, having a crystallinity of 80%, as determined by X-ray examination, are obtained.

*Example 7*

The polymerization is carried out as in Example 1, with the exception that 180 cc. of the same benzene solution of cobalt chloride-pyridine complex and 680 cc. of benzene are employed (Al/Co molar ratio=180). After 15 hours of the polymerization reaction is stopped as described in Example 1 and the polymer produced is dried at 50° C. under vacuum. The polybutadiene thus obtained (19 g.), has syndiotactic-1,2-structure and a crystallinity of 85.5% as measured by X-ray examination.

*Example 8*

The polymerization is carried out as in Example 2, with the exception that the $Al(C_2H_5)_2Cl$ and $Al(C_2H_5)_3$ are separately introduced; first 2 g. of $Al(C_2H_5)_2Cl$ and then after 1 minute, 1.9 g. of $Al(C_2H_5)_3$ (Al/Cl molar ratio=2; Al/Co molar ratio=430).

The reaction is stopped after 1 hour as shown in Example 1 and the polymer is dried at 50° C. under vacuum. 35.5 g. of polybutadiene having a syndiotactic-1,2-structure and possessing a crystallinity of 81%, as measured by X-ray examination, are obtained.

*Example 9*

The polymerization is carried out as in Example 1, but $Al(C_2H_5)_3$ is replaced by the same molar amount of $Al(i-C_4H_9)_3$.

The reaction is stopped after 15 hours by addition of methanol containing an antioxidant and the polymer is dried at 50° C. under vacuum. The polybutadiene obtained (21 g.) has a syndiotactic-1,2 structure and shows a crystallinity of 73% by X-ray examination.

*Example 10*

The polymerization is carried out as in Example 8, but the order of introduction of the alkyl aluminum compounds is inverted i.e., by first introducing 1.9 g. of $Al(C_2H_5)_3$ and then 2 g. of $Al(C_2H_5)_2Cl$.

The reaction is stopped after 1 hour by adding methanol containing an antioxidant and the polymer product is dried at 50° C. under vacuum.

28.8 g. of polybutadiene having syndiotactic-1,2 structure and a crystallinity of 85% as determined by X-ray examination, are obtained.

*Example 11*

The polymerization is carried out as in Example 1, but the $CoCl_2$ is replaced by $CoI_2$, also in the form of a complex with pyridine $CoI_2$—$2(C_5H_5N)$. 60 cc. of a benzene solution of the $CoI_2$-pyridine complex having a concentration of 0.175 g. of Co per liter are used. (Al/Co molar ratio=185.)

The reaction is stopped after 15 hours by addition of methanol containing an antioxidant and the polymer is dried at 50° C. under vacuum. The polybutadiene obtained (68 g.) has a syndiotactic-1,2 structure and shows a crystallinity of 75% by X-ray examination.

*Example 12*

Various polymerization runs are carried out under the conditions described in Example 2, but using mixtures of $Al(C_2H_5)_3$ and $Al(C_2H_5)_2Cl$ in various different ratios.

The reactions are stopped after 1 hour by adding methanol containing an antioxidant and the polymers thus produced are dried at 50° C. under vacuum. The quantities and the characteristics of the polymers obtained are reported in the accompanying table.

The concentrations of organic aluminum compounds are expressed as millimols (mM.).

butadiene thus obtained (40 g.) is found by infrared examination to have syndiotactic-1,2 structure and a crystallinity of 78% by X-ray examination.

Example 17

The polymerization is carried out as in Example 14, but the anhydrous $CoCl_2$ is replaced by $NiCl_2$ in the same

| Run No. | $Al(C_2H_5)_3$, mM. | $Al(C_2H_5)_2Cl$, mM. | Polymer, g. | Crystallinity (X-ray exam.), percent | Structure | Infrared examination | | |
|---|---|---|---|---|---|---|---|---|
| | | | | | | Trans-1,4, percent | Cis-1,4, percent | 1,2, percent |
| 1 | 33.4 | | 20.5 | 77 | Syndiotactic | | | Above 98 |
| 2 | 29.3 | 4.1 | 29.1 | 79 | do | | | Above 98 |
| 3 | 25 | 8.4 | 31.3 | 83.1 | do | | | Above 98 |
| 4 | 18.3 | 15.1 | 33.6 | 87.6 | do | | | Above 98 |
| 5 | 16.7 | 16.7 | 36.4 | 91 | do | | | Above 98 |
| 6 | 15.8 | 17.6 | 30.4 | 90 | do | | | Above 98 |
| 7 | 15.3 | 18.1 | 10.4 | 71 | do | | | Above 98 |
| 8 | 13.1 | 20.3 | 34.1 | Amorphous | do | 6.2 | 81 | 12.8 |
| 9 | 11.6 | 21.8 | 55.2 | do | do | 5.1 | 86 | 8.1 |
| 10 | 8.3 | 25.1 | 79 | do | do | 3.2 | 90 | 6.8 |
| 11 | 5 | 28.4 | 88.3 | do | do | 2.1 | 95 | 2.9 |
| 12 | | 33.4 | 98 | do | do | 2.1 | 96 | 1.9 |

Example 13

The polymerization is carried out as in Example 1, except that $P(C_2H_5)_3$ is used as the complexing agent with $CoCl_2$, $(CoCl_2 \cdot 2P(C_2H_5)_3)$ instead of pyridine. 0.0215 g. of $CoCl_2$ are used (Al/Co molar ratio 200).

The reaction is stopped after 15 hours with methanol containing an antioxidant and the polymer is dried at 50° C. under vacuum.

The polybutadiene obtained (25 g.) has a syndiotactic-1,2 structure, and shows a crystallinity of 88.6% by X-ray examination.

Example 14

The polymerization is carried out as in Example 1, except that there is employed, with the same amount of solvents, 4 g. of anhydrous $CoCl_2$ without any complexing agent and 2.4 g. of $Al(C_2H_5)_3$ (Al/Co molar ratio 0.65).

The reaction is stopped after 6 hours by addition of methanol containing an antioxidant and the polymer is dried at 50° C. under vacuum. The polybutadiene thus obtained (63 g.) has a syndiotactic-1,2 structure as measured by infrared spectrography and a crystallinity of 75% by X-ray examination.

If the same catalyst is used, however aging it for 6 hrs. at room temperature before using it, 100 g. polymer are obtained which by infrared spectrography is shown to possess 80% of cis-1,4, 15.5% 1,2-syndiotactic and 3.5% trans-1,4 structure.

If the same $CoCl_2$—$Al(C_2H_5)_3$ catalyst is used, however with a Al to Co molar ratio higher than 4, the catalyst loses its activity rapidly: if a catalyst with a Al to Co molar ratio of 6 is used after 2 hours of aging only very little polymer is obtained.

Example 15

The polymerization is carried out as stated in the first part of Example 14, but the 1,3-butadiene is added immediately after the organometallic compound.

The reaction is stopped after 6 hours as in the preceding example and the polymer is dried at 50° C. under vacuum.

The polybutadiene thus obtained (72 g.) is shown by infrared examination to have a syndiotactic-1,2 structure and a crystallinity of 82% by X-ray examination.

Example 16

The polymerization is carried out as in example 15, but the catalyst is aged for 60 minutes before adding the butadiene.

The polymerization reaction is stopped after 6 hours by the addition of methanol containing an antioxidant and the polymer is dried at 50° C. under vacuum. The polymolar amount. The reaction is stopped after 10 hours by addition of methanol containing an antioxidant and the polymer is dried under vacuum at 50° C. The polybutadiene obtained has mostly a syndiotactic 1,2-structure and shows a crystallinity of 50% by X-ray examination.

Example 18

The polymerization is carried out by operating as in Example 1, but the cobalt chloride pyridine complex is replaced with 1 g. of anhydrous $PdCl_2$ without any complexing agent (Al/Pd molar ratio=5.88). The polymerization is stopped after 20 hours by addition of methanol containing an antioxidant and the polymer solvent is dried at 50° C. under vacuum.

The polymer is found to be predominantly crystalline syndiotactic-1,2-polybutadiene.

Example 19

The polymerization is carried out by operating as in Example 1, but the cobalt chloride pyridine complex is replaced with 0.8 g. of anhydrous $PtCl_4$ without any complexing agent (Al/Pt molar ratio of 14.4). The polymerization is stopped after 20 hours by the addition of methanol containing an antioxidant and the polymer is dried at 50° C. under vacuum.

The polymer is found to be predominantly crystalline syndiotactic-1,2-polybutadiene.

Variations can of course be made from the above disclosure without departing from the spirit of the present invention.

Having described the present invention what is desired to secure and claim by Letters Patent is.

We claim:

1. A process for obtaining crystalline polybutadiene having a syndiotactic 1,2-structure, which comprises polymerizing butadiene-1,3, at a temperature of $-25°$ C. to $+30°$ C., in contact with a freshly prepared catalyst which has been aged at room temperature for not longer than one hour prior to use in said process, and prepared from a halide of a group 8 metal of the Mendeleeff Periodic Table and a mixture of compounds of the formulae $AlR_3$ and $AlR'_2X$ in an $AlR_3/AlR'_2X$ molar ratio of at least 0.8:1, wherein R and R' each represents an alkyl group containing 1 to 5 carbon atoms and X represents a halogen atom, the aluminum/group 8 metal molar ratio in said catalyst being from 0.3 to 500.

2. A process according to claim 1, wherein R and R' are each selected from the group consisting of ethyl and isobutyl groups.

3. A process according to claim 1, wherein X is chlorine.

4. A process according to claim 1, wherein the $AlR'_2X$ compound is Al(C$_2$H$_5$)$_2$Cl and the AlR$_3$ compound is selected from the group consisting of Al(C$_2$H$_5$)$_3$ and Al(i-C$_4$H$_9$)$_3$.

5. A process according to claim 1, wherein the group 8 metal halide is employed in the form of a complex with a member selected from the group consisting of pyridine, pyrrole, morpholine, aliphatic amines, nitriles, amides, alcohols, ketones, and phosphorus-containing compounds.

6. A process according to claim 1, wherein the group 8 metal halide is a halide of cobalt.

7. A process according to claim 1, wherein cobalt chloride is used as the group 8 metal halide.

8. A process according to claim 1, wherein a cobalt chloride pyridine complex is used as the group 8 metal halide.

References Cited by the Examiner

UNITED STATES PATENTS 2,953,556  9/60  Wolfe et al. _____ 260—94.7
2,977,349  3/61  Brockway et al. _____ 260—82.1

FOREIGN PATENTS 573,680    12/58  Belgium.
587,698    1/59   Italy.
1,171,087  9/58   France.

JOSEPH L. SCHOFER, *Primary Examiner.*

L. H. GASTON, J. R. LIBERMAN, WILLIAM H. SHORT, *Examiners.*